May 9, 1950 P. WEATHERS 2,507,188

ELECTROSTATIC PHONOGRAPH PICKUP

Filed May 13, 1947 2 Sheets-Sheet 1

INVENTOR.

BY PAUL WEATHERS

Leo Edelson

ATTORNEY

ELECTROSTATIC PHONOGRAPH PICKUP

Filed May 13, 1947 2 Sheets-Sheet 2

INVENTOR.
PAUL WEATHERS
BY
Lear Edelson
ATTORNEY

Patented May 9, 1950 2,507,188

UNITED STATES PATENT OFFICE 2,507,188

ELECTROSTATIC PHONOGRAPH PICKUP

Paul Weathers, Haddon Heights, N. J., assignor to Herbert K. Neuber, Philadelphia, Pa.

Application May 13, 1947, Serial No. 747,798

10 Claims. (Cl. 179—100.41)

The present invention relates to vibration translating devices for translating mechanical vibrations into corresponding electrical variations. More particularly, the invention relates to vibration translating devices of the variable capacity type adapted to operate as electro-acoustical transducers in the reproduction of phonograph records and the like, through the medium of an electrical system connected therewith.

In the electro-acoustical translation of vibrations from the sound track of a phonograph record, it is desirable to produce maximum electrical variations corresponding faithfully to the sound, and with a minimum of record wear and mechanical noise. For best results this necessitates a reduction in weight not only of the translating device but of the stylus element which engages the sound track or record groove. However, in the reduction of weight and stylus pressure, difficulty is encountered in providing accurate tracking at various frequencies, and prior to the present invention it has not been practical to reduce the stylus point pressure on the record to below half an ounce (approximately 14 grams).

It is, therefore, a primary object of this invention to provide a vibration translating device of the electro-acoustical type for the reproduction of phonograph records and the like, of extremely light-weight and of such low stylus point pressure that it will follow the sound track of the record at all recorded frequencies accurately. Extremely low stylus point pressures down to that of the order of one gram or less may thus be attained.

The problem of translating mechanical vibrations into corresponding electro-acoustical variations, as in the reproduction of phonograph records, with stylus pressures of the order of those contemplated, is further complicated by the fact that heretofore, the electrical output normally would be limited and reduced in proportion to the reduction in weight of the transducer, whereas a high electrical output and corresponding signal variation is desired.

It is therefore a further object of this invention to provide a light-weight vibration translating device which will follow accurately the sound track of a phonograph record with a stylus pressure of the order of one gram or less, and which at the same time will provide relatively large electrical variations corresponding to the recorded sound.

It is also a further object of this invention to provide a vibration translating device of the variable capacity type having a movable capacity element providing minimum mass and maximum flexibility or compliance in response to vibration or movement by the sound track of a phonograph record, thereby facilitating the accurate tracking of the stylus while at the same time providing a maximum range of electrical control or output.

Vibration translating devices for electro-acoustical transducers of the variable capacity type may be constructed with a single light-weight moving element or capacity plate which may move with respect to one or more fixed plates, thereby to vary the capacity between the movable and fixed elements to control an electrical circuit. Preferably, the variable capacity thus provided is connected into the circuit of an oscillation generator to modulate the same, or otherwise control the electrical output thereof corresponding to the capacity variation, which in turn follows the sound track vibrations.

By this means a wide variation range may be attained in the electrical output of the oscillation generator circuit with a comparatively small variation in the controlling capacity. The electrical circuit control of a variable capacitor device may be enhanced greatly by the use of an oscillator circuit of the type shown, described and claimed in my co-pending application, Serial No. 636,702, filed December 22, 1945, now Patent 2,436,129, issued Feb. 17, 1948, for Oscillators. The device of the present invention is particularly adapted for use in the system referred to.

In accordance with the present invention, a variable capacity electro-acoustical transducer of the phonograph pick-up type is provided with a movable capacity element of light-weight tubular construction, at one end thereof having a stylus element adapted to fit a record groove and its opposite end being mounted on and fixed to a base member which carries two insulated capacity elements on opposite sides of the stylus element and in close substantially equally spaced relation thereto. The variable capacity pick-up is preferably mounted, as a plug-in unit, in one end of a light-weight tubular tone arm, which latter in turn is capable of both lateral and vertical movement for operation in connection with a record turntable.

An important advantage of the tubular construction, not only of the tone arm but of the stylus element, is that it provides maximum strength with minimum weight which is necessary for best results in apparatus of this character. Furthermore, by utilizing a tubular tone arm and a plug-in pick-up unit closing the free end thereof, the tone arm per se provides a shield housing for the pick-up unit while the closure prevents the entrance of foreign material incident to the playing of records. At the same time, because of the resultant simplification of construction, further saving in weight is attained.

The tubular construction, furthermore, permits the control circuit leads to be extended centrally or co-axially of the tone arm with the leads separated from each other by a simple strip of insulating material extending diametrically of the tubular tone arm, thereby maintaining a substantially constant and relatively low capacity between said leads and tubular wall of the tone arm. The latter being metallic thus provides effective shielding throughout the length of the arm.

It is, therefore, a still further object of this invention to provide an electro-acoustical vibration translating device which may be mounted as a removable plug-in unit for the free end of a lightweight tubular tone arm for phonograph record reproduction and the like.

It is also an object of the invention to provide a variable capacity electric pick-up or vibration translating device of minimum size and weight having a single moving element or armature member of minimum mass and inertia, and having maximum flexibility in a plane of vibration responsive to the sound track of a phonograph record, and which may be tuned for cut-off in response in any predetermined frequency range.

By reason of the tubular plug-in construction of the pick-up device of the present invention, it is also readily adapted for use in standard molded plastic tone arms presently used in a major portion of the equipment being provided for the commercial market. In this case, the supporting frame of the device which is metallic, is arranged to connect with the metallic shield of a shielded twisted-pair transmission line in the tone arm, whereas with the tubular metallic tone arm, contact is made directly with the tone arm which provides both shielding and an output conductor connection for the frame of the variable capacity device or pick-up unit.

For full effectiveness as a modulator or circuit control means, the variable capacity electro-acoustical transducer of the present invention is preferably in the form of a push-pull variable capacitor as hereinbefore indicated, wherein a tubular armature or stylus member is provided wth a stylus which engages the record groove and moves laterally in response to the sound track variations, between two fixed electrodes or capacity elements on opposite sides thereof, to effect a push-pull or diffrential corresponding capacity variation that may be applied to the control of an oscillation generator or the like with maximum effectiveness and signal voltage output.

It is, therefore, an object of this invention to provide an improved vibration translating device of the push-pull variable capacity type for effecting maximum capacity variation with minimum weight and minimum stylus pressure.

It is a further object, also, to provide an improved variable capacity electric pick-up or vibration translating device of substantially minimum weight, having a movable stylus or armature member of minimum mass and maximum stiffness between its free end and the point of bending or pivot, which will track accurately in a record sound groove with minimum pressure on the stylus and provide a maximum differential capacity variation for the control of the output signal of an oscillation generator or the like in response to recorded sound in the groove of a phonograph record or the like.

Other objects and advantages of the present invention will be apparent hereinafter, it being understood that the present invention consists in the combination, construction, location and relative arrangement of parts as more fully hereinafter shown in the accompanying drawings and as finally pointed out in the appended claims.

In the accompanying drawings, which are illustrative of certain preferred embodiments of the present invention:

Figure 1:
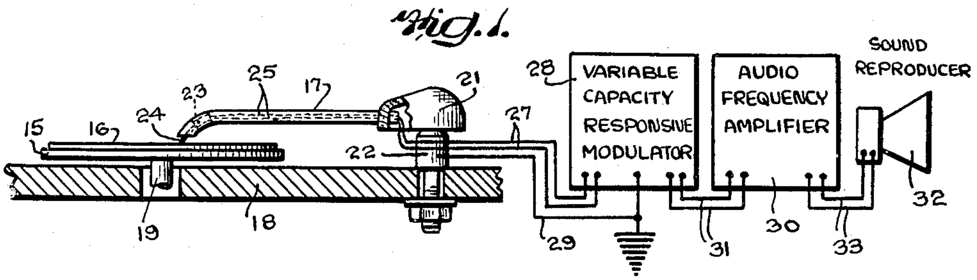
Figure 1 is a schematic circuit diagram of a phonograph record sound reproduction system provided with a vibration translating or pick-up device embodying the invention.
Figure 2:
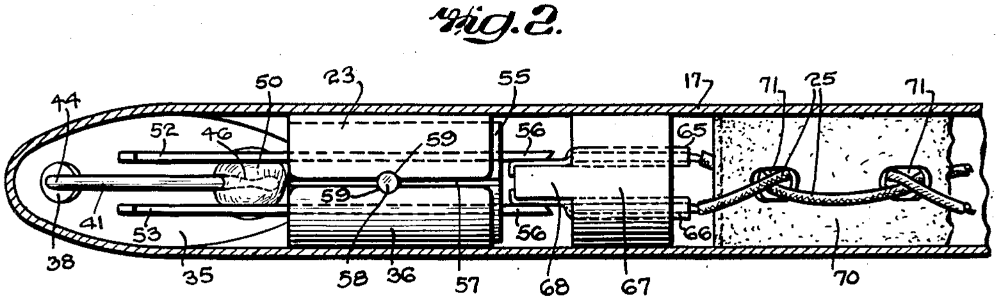
Figures 2 and 3 are top and side views respectively of a vibration translating device embodying the invention, shown on a greatly enlarged scale with respect to Figure 1 in which it is used.
Figures 3, 4, 5, 6:
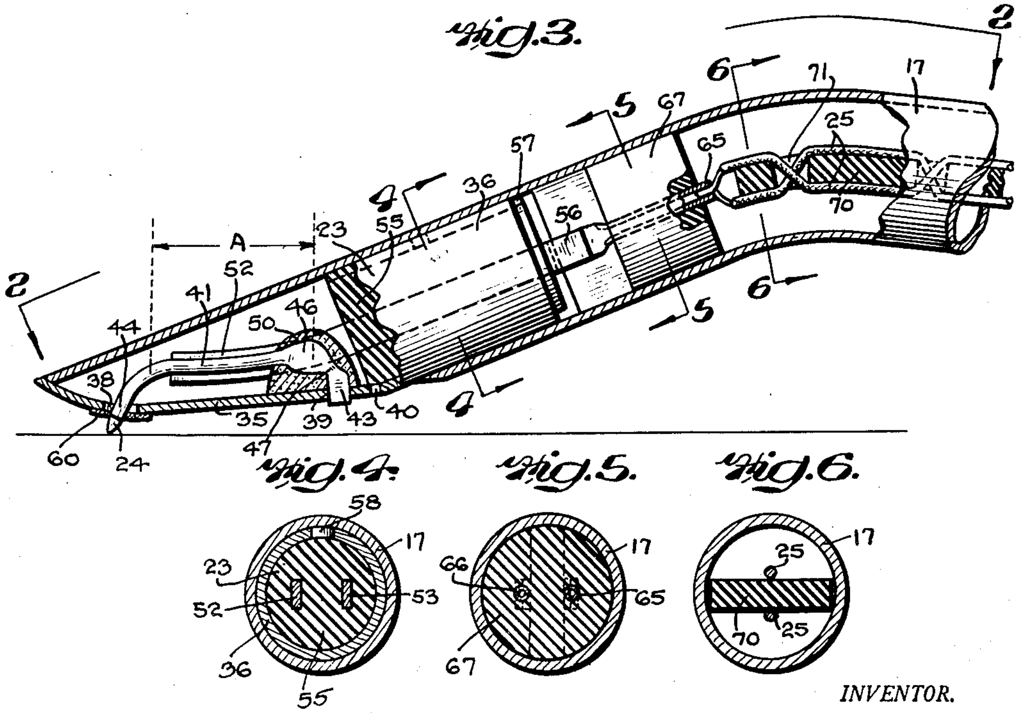
Figure 7:
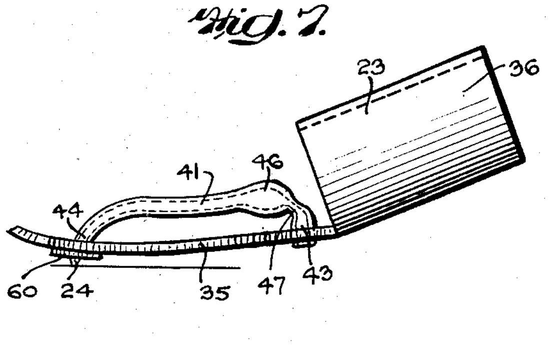
Figure 8:
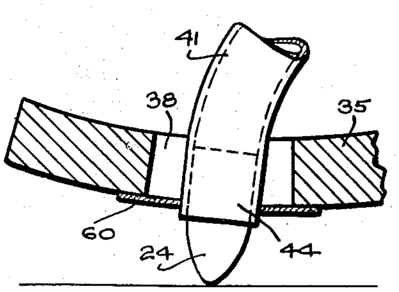
Figure 9:
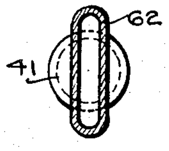
Figure 10:
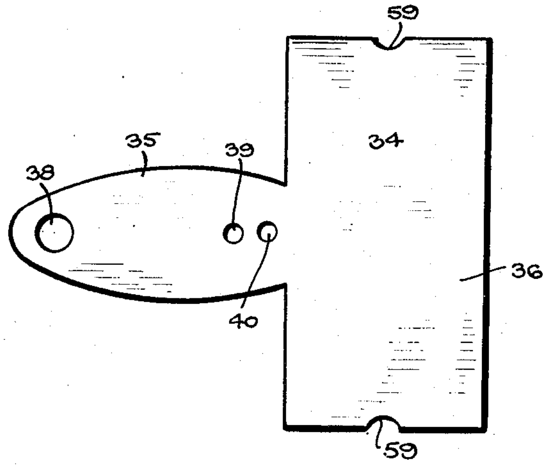
Figure 11:
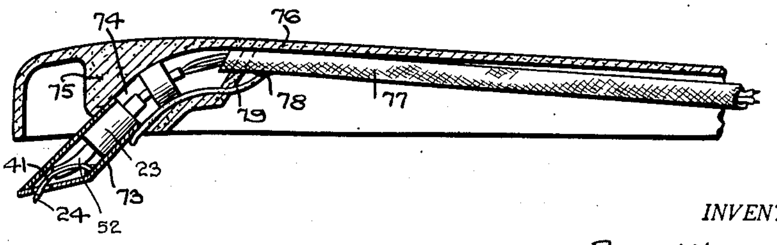

Figures 4, 5 and 6 are cross sectional views of the device of Figures 1, 2 and 3, taken on lines 4—4, 5—5 and 6—6 respectively of Figure 3 and on the same scale, to show further details of construction;

Figure 7 is a side view of a portion of the structure shown in Figures 2 and 3 and on the same scale also to show further details of construction;

Figure 8 is a further and greatly enlarged view partly in cross section, of certain portions of the structure shown in Figure 7;

Figure 9 is a vertical sectional view of a modified construction of the stylus-supporting armature;

Figure 10 is a plan view of a portion of the structure shown in Figures 2, 3 and 6, showing a step in the process of fabrication, and on the same scale; and Figure 11 is a side view, partly in cross section, and substantially full size, of a vibration translating device embodying the invention, showing a modification in the mounting thereof.

Referring now to the drawings and more particularly to Figure 1, it will be observed that the phonograph record reproducting system comprises a turntable 15 adapted to carry a phonograph record indicated at 16 and a tone arm 17 mounted on a suitable supporting structure 18, shown in partial cross-section. The turntable may be driven through a shaft 19 by any suitable means, such as an electric phonograph motor (not shown).

The tone arm 17 is secured to a supporting bracket 21 which is suitably mounted, as upon a stud 22 secured to the support 18, for limited universal movement, the tone arm being thus adapted to be horizontally shifted and vertically lifted for use in conventional manner. A vibration translating device or pick up 23, constructed in accordance with and embodying the principles of the present invention, is mounted as a plug-in unit within the tone arm 17 to close the free end thereof. The stylus of the pick-up unit is indicated at 24 in engagement with the record groove, the device as shown being adapted for operation with lateral cut records.

As will appear more clearly hereinafter, the pick-up 23 is contained within a supporting frame or housing in electrical connection with the tubular metal tone arm 17, while the output leads, indicated at 25, extend through the center of the arm and out at the rear end as shown. A counterweight element (not shown) may be provided at the rear end of the arm as shown, to balance the weight of the tone arm, thereby providing only sufficient pressure to maintain the stylus in the groove of the record. The foregoing arrangement is shown by way of example to illustrate the mounting arrangement for the device of the present invention in one of its present preferred embodiments.

The tone arm 17 is of thin-walled tubular metal construction of the order of about one-quarter inch inside diameter and of suitable length to clear records of all diameters to be reproduced. It is positioned on the record 16 for traversing the sound groove in the usual manner as the record rotates and provides the usual tangential offset for the stylus axis. The free end of the tone arm is closed by the pick-up unit 23 as above pointed out and is shaped to lie substantially parallel to the record surface so that the stylus 24 may extend a short distance therefrom to engage the record groove as shown.

The output leads 25, consisting of a twisted-pair of insulated conductors, extend through the arm as shown and externally thereof at the rear end as indicated at 27, to connect with any suitable electrical system, indicated in the present example as a variable capacity responsive modulator 28. A ground connection 29 is provided between the device 23 and the modulator through the tone arm and the stud 22 as shown. The pick-up or vibration translating device 23 then operates as a push-pull variable capacitor to vary the capacity between each of the leads 25 and the ground lead 29 differentially, as will hereinafter be described.

The variable capacity responsive modulator may be any suitable device of that character, such as a variable frequency oscillator responsive to variation in the capacity between the leads 25 and 29 as above referred to, or may be arranged as shown, described and claimed in my aforesaid co-pending application.

The modulated signal output from the system 28 may be utilized in any suitable manner. For example, the output may be applied to an audio frequency amplifier 30 through connections, indicated at 31, and the output from the amplifier in turn may be applied through connections, indicated at 33, to a sound reproducer, such as a loud speaker indicated at 32, thus providing a complete sound reproducing system for phonograph records and the like. However, the pick-up or vibration translating device of the present invention may be utilized in other ways and for other purposes involving the effective translation of vibrations into electrical circuit variations through the medium of variable capacity in a wider frequency range of operation, as will be understood from a further consideration of the details of the device and system.

Referring now to Figures 2 to 9, inclusive, in which like parts throughout are designated by the same reference numerals, the tone arm 17 is indicated in outline form in Figures 2 and 3 for the purpose of more clearly indicating the interior of the arm and the pick-up unit 23 per se.

The pick-up unit 23 comprises a thin metallic supporting element 34 providing a floor plate 35 for the unit and closure means for the end of the tone arm when the pick-up unit is inserted therein. Connected with and preferably integral therewith as shown, is a split sleeve or body portion 36 extending rearwardly from the floor plate and adapted to be frictionally fitted into the interior of the tone arm to establish tight mechanical and electrical contact therewith.

The external housing or frame of the pick-up unit is preferably formed of a sheet metal blank, the latter being shown in Figure 9 before it is rolled and bent to provide the split sleeve section 36 and tang extension at an angle thereto as the floor plate 35. The latter is provided with a forward or frontal opening or perforation 38 and two spaced perforations or openings 39 and 40 at the rear thereof, as shown more clearly in Figure 9. An armature 41 for the stylus 24, of elongated, shallow U-shaped form, is mounted longitudinally of and in spaced relation to the floor plate 35 between the perforations or openings 38 and 39, the rear end 43 being rigidly secured within the opening 39 by soldering or other suitable means, and the forward end 44 extending centrally through the perforation 38 to position the stylus point 24 just below the floor plate 35 (see more particularly Figures 3, 7 and 8).

As most clearly appears in Figure 8, the stylus point 24 is seated within the end 44 of the armature 41 with a tight fit. However, friction alone is not depended upon for the seating of the rear end of the armature within the opening 39, such securement being effected preferably by soldering with silver chloride paste and baking at about 700° F. It has been found that this provides a vibration-proof mounting which may be adapted for a high rate of manufacture at low cost.

The stylus point 24 is preferably a hard natural or synthetic sapphire, although it may be composed of any suitable plastic or metal of sufficient hardness to prevent undesirable wear and deformation of the point. At present the stylus point 24 is preferably a sapphire of synthetic aluminum oxide made in quantity by turning down and cutting off each element from a rod of the material, the point being formed substantially in the shape shown with a radius of $.0025'' \pm .0002''$. The tubular stylus support or armature 41, as well as the tone arm 17, may be made preferably of aluminum or stainless steel, with a maximum stiffness with minimum mass as provided by the hollow tubular construction.

The shape of the stylus point is important in a low pressure pick-up or vibration translating device for phonograph records and the like. In this device a fine point may be used to better fit the groove, this being a point which generally may be found to be too fine for a high pressure pick-up, that is, a pick-up providing a pressure of the stylus point in the record groove of the order of 28 grams or more.

While the armature member 41 is rigidly mounted at 43 in the base plate 35 of the supporting structure, it is provided with lateral flexibility to a high degree by reducing the cross section at a point in spaced relation to the stylus point and more adjacent to the fixed end 43, as indicated at 46. This is accomplished preferably by simply crimping or flattening a short length of the tubular armature to reduce the cross section in a vertical plane, as at 46 (see Figure 3).

Likewise a slight vertical compliance may be given the stylus member by further crimping or flattening the tubular section, as indicated at 47, in the horizontal plane, as shown more clearly in Figures 3 and 7, this zone of vertical compliance being located approximately midway between the fixed end 43 and the lateral compliance or bending zone 46.

Lateral and vertical movement of the armature member in response to movement of the stylus is preferably damped by means of a body of vibration-absorbing material secured to the floor plate 35 and extending about and secured to the vertical and horizontal compliance hinges 46 and 47, as indicated at 50. This material is preferably highly inert at all vibrational frequencies and may be formed by applying a drop of liquid "Viscoloid" and permitting the same to harden in place substantially in the form shown, about the joints.

The compliance at zone 47 is only sufficient to permit the stylus 24 to retract under slight pressure when meeting any obstruction in a vertical direction which would tend to damage it, whereas the compliance in the horizontal direction at zone 46, which may be considered as a flexible hinge, is sufficient to permit the armature 41, in response to actuations from the stylus point 24, to track accurately at all frequencies encountered in the reproduction of records and the like. Specifically, the armature member has high vertical compliance at the hinge or bending point 47, but is vertically stiff at all other points along its length toward the stylus end.

In order to realize the proportions of the parts, it should be considered that the mass of the moving element 41 is substantially infinitesimal since it is a thin-walled hollow tube of needle-like proportions. Therefore, since the mass is reduced to substantially an irreducible minimum, the stylus pressure in the record groove may be made of the order of one gram or less while permitting the stylus point 24 to track accurately in the record groove at all frequencies.

This is essential to full fidelity reproduction of records of high quality, and is due in part to the fact that the armature member 41 has an extremely flexible hinge portion adjacent the fixed end thereof, with a longer rigid or stiff portion between the hinge portion and the stylus or movable end. The mass, stiffness or modulus of elasticity of the material determines the length of the rigid portion, and the length determines the frequency of cut-off for the pick-up device at the high frequency end.

Thus maximum stiffness and light weight are combined in the tubular form of the armature or stylus member as well as in the supporting tone arm. In operation the stylus point 24 engages the groove or sound track of the record and the armature, acting as a cantilever beam, vibrates laterally in accordance with the sound vibrations and produces a corresponding differential variation in capacity between it and a pair of spaced fixed electrodes 52 and 53 located astride thereof as shown more clearly in Figures 2 and 3. The arrangement is such that the fixed capacity electrodes 52 and 53 are substantially equally spaced on opposite sides of the armature element and lie generally in the same horizontal plane of movement of the armature element within the length of the stiff portion of the latter as indicated in Figure 3 between the limits A.

The electrodes 52 and 53 are preferably substantially rectangular in cross section with each being curved rearwardly in a vertical plane to extend substantially parallel with the axis of the tone arm 17 through the sleeve portion 36 of the external housing or frame of the pick-up unit. These electrodes 52 and 53 are held rigidly in spaced relation as shown within the sleeve by means of a plug 55 of insulating material through which they extend at the rear to form spaced contact terminals 56—56.

The plug 55 of insulating material may be of molded vinylite or other suitable insulating plastic and completely fills the sleeve portion of the support at the rear of the stylus support 41, the preferred arrangement of the electrodes 52 and 53 within the plug being most clearly shown in Figure 4.

The insulating plug 55 is shouldered at the rear and is pressed, as a unit with the capacitor electrodes, into the sleeve 36 and frictionally held thereby. This unitary assembly is further locked in position and holds the electrodes 52 and 53 in spaced parallel relation with the stylus member by an integral rib 57, shown more clearly in Figure 2, extending axially along the periphery of the plug 55. At a point between the ends of the rib 57 the thickness or width is expanded to form an integral locking stud or key 58 which extends through the open slot in the sleeve 36, the opposite split edges of which are complementally notched, as at 59—59, to form a recess which embraces the stud 58 and so prevents longitudinal movement of the plug 55 when the pick-up cartridge or unit is seated in the tone arm for frictional retention therein.

The molded key or stud 58 thus keys the plug in the sleeve 36 and inasmuch as the sleeve cannot expand to permit removal of the plug and the elongated electrodes 52 and 53 as a unit until the same is removed from the tubular arm, the unit is securely held in position when frictionally inserted into the tone arm. The delicate operating elements are thus effectively protected from damage.

The opening 40 provides for removal of the unit from the tone arm by inserting any suitable pointed tool (not shown) therein from below, and exerting pressure in an axial direction outwardly of the tone arm until the unit is withdrawn.

Additional protection against the entrance of dust or foreign materials from the record surface through the opening 38 is provided by a suitable flexible window element or closure means 60 shown most clearly in Figures 7 and 8. This may be a thin sheet of "latex" rubber or sheer "nylon," or sheet "Viscoloid" dissolved in amyl-acetate to make a synthetic material which provides a very satisfactory flexible window. This material must be so sufficiently thin and flexible that it does not add any appreciable damping to the stylus point. The material in the window 60 acts as a screen and filter for the dust-laden air about the stylus point and prevents such material from entering the air gaps. The material across the window may be stretched to form a conical shape with the stylus point at the apex to produce greater flexibility.

As hereinbefore referred to, in order to provide a relatively high degree of capacity change, that is, a maximum capacity variation between the movable and fixed electrodes, the stylus support or armature 41 may be compressed or deformed along the length of the area A, Figure 3, to the form shown in the cross section at 62 in Figure 9, the remaining portion of the stylus member being of normal circular cross section as shown. This is a further desirable feature of the hollow tube structure of the stylus member in that it may be shaped readily by compressing the side walls, not only for producing a wide area for maximum capacity change or frequency control, but for the control of the flexibility at the hinge joints 46 and 47. However, the extent of the increase is limited in that, beyond a predetermined point, an increase in capacity effected by increasing the diameter introduces an increase in armature mass and inertia. In the present preferred embodiment of the invention, the outside diameter of the stylus is .020″, while that of the armature tube is 0.025″ with an inside diameter of approximately .020″. Thus, relatively small size and light weight in the device is realized without sacrificing tracking ability of all frequencies, and high voltage output or control is attained beyond any known device for this purpose.

As indicated in Figure 1 and the description thereof, three output connections are provided for the pick-up unit of the present invention, one being provided through the medium of the metallic arm for the frame of the unit and the directly connected stylus member which acts as the movable capacity element of the push-pull variable capacitor arrangement. The remaining two connections, also as indicated in Figure 1, are provided through the medium of the two leads forming a twisted-pair extending through the center of the tone arm, for the two fixed electrodes.

Details of this connection are shown more completely in Figures 2, 3, 5 and 6, to which attention is now more particularly directed. It will be seen that the metallic frame of the pick-up unit comprising the integral elements 35 and 36 are pressed into and engage the tone arm walls to establish mechanical and electrical connection therewith for the stylus support 41. The leads 25—25 forming the transmission line respectively terminate at the pick-up unit in two elongated contact elements 65 and 66 mounted in a block of insulating material 67 which forms a connector plug frictionally held within the tone arm at the rear of the pick-up unit as shown in detail in Figures 2 and 3.

The connection plug contacts 65 and 66 extend forwardly to engage contacts 56—56 of the pick-up unit when plugged into position as shown, the contacts 65 and 66 being respectively clamped between the contacts 56—56 and a supporting block of insulation 68 which is formed as an integral extension of the plug 67. With this arrangement the pick-up unit may be inserted or removed from the end of the tone arm and may be connected with and disconnected from the transmission line without the use of tools, while at the same time assuring positive electrical connection when in use.

It is essential that the transmission line comprising the leads 25—25 be maintained in substantially fixed relation to the shield or tone arm wall 17 and to this end these leads are secured to a thin strip of non-hygroscopic insulating material 70 which is of a width, as shown more clearly in Figure 6, to lie across a diameter of the tone arm and thus be located accurately and held in the center of the tone arm without the use of additional holding or securing means.

The leads 25—25 may be secured to the center of the strip 70, as shown in Figure 5, by any suitable arrangement or means, such as by threading the same through spaced perforations 71 positioned along the strip midway between the edges thereof. It will be noted that the leads should be suitably insulated when threaded and/or twisted together as shown, although it is possible to use bare conductors if they are maintained on opposite sides of the insulating strip, in the positions indicated in Figure 6, throughout their length. This arrangement is not only effective but provides for establishing the position of the leads with a minimum weight and with a minimum of constructional detail and cost. Also, if desired, the leads 25—25 may be embedded in the strip 70 during the process of molding the same or they may be cemented in longitudinally extending grooves formed for the purpose in one or both sides of the strip. Further the connector plug 67 may be formed as an integral part of the supporting strip 70 for the leads, in which event the contact elements 65 and 66 are formed as terminals, respectively, of the leads 25—25 carried by the insulating supporting strip 70.

While the use of an elongated relatively small-diameter tubular tone arm of extremely light weight is highly desirable for use in the pick-up system provided by the invention, the desirable frequency characteristic and low stylus pressure of the present invention may be obtained in part at least in connection with other types of tone arms, notably those plastic arms now in extensive commercial use on manual playing and automatic record changers.

From a further consideration of the complete unit, as illustrated in Figures 2 and 3 more particularly, it will be seen that it is adapted to be inserted in any suitable socket or receptacle arrangement other than the tubular arm shown in the figures referred to, with slight modification. For a consideration of this modified form of the plug-in pick-up unit attention is now directed to Figure 11, along with Figures 2 and 3, in which like parts are indicated by the same reference characters as in the preceding figures.

The sleeve portion 36 of the pick-up unit frame is extended to cover the stylus support 41 and the electrodes 52 and 53, thereby forming a casing 73 for the pick-up unit. This is inserted into a socket or tubular opening 74 provided in a block of insulating material 75 provided adjacent the forward end of the hollow interior of tone arm 76. In the present example, the block 75 is formed integral with the arm and is provided with a terminal plug 67 as in the preceding example. However, the block 75 may be of a form adapted to be removably secured to the tone arm 76.

The transmission line leads 25—25 are carried in a shielded cable 77, the outer braid of which is connected as indicated at 78, to a metallic connection strip 79 extending along the wall of the socket 74 and engaging the sleeve or casing 73 to provide the output connection for the stylus member. The leads enter the rear of the block 75 through an extension of the socket 74.

From the foregoing consideration of the invention, it will be seen that a variable capacity pick-up unit is provided in which the supporting structure is of extremely light weight sheet metal comprising a split sleeve co-extensive with a floor plate or cover which is adapted to support and protect the tubular stylus member mounted thereon. The stylus member per se is tubular and is of extended shallow U-shape, with one short leg thereof secured at the rear to the supporting structure floor plate and the forward end extending through a window or opening in the forward end of the floor plate to carry a sapphire or other relatively hard, long-wearing, fine-pointed stylus inserted therein and secured without any added holding device. The window or opening is effectively sealed against the entrance of dust and other foreign matter from the record surface by a thin screen of suitable flexible material which in itself adds no appreciable weight to the device.

Separable from the above described portion of the pick-up device are the two associated fixed electrodes mounted in a plug of insulating material which is readily inserted into and removable from the sleeve of the supporting structure and keyed and locked in definite position for spacing and locating the electrodes, by a simple integral rib and key element, which latter effectively interlocks with the sleeve when confined by insertion within the tone arm.

It will be seen furthermore, that the armature member in addition to having minimum mass and maximum stiffness is bowed or arcuate in form, with one end secured to the fixed support while the opposite end is freely disposed and provided with a stylus for engagement with a record groove. In response to vibration of the stylus, the armature moves as a unit about the vertical hinge or bending area 46 which is highly flexible, and conforms in amplitude to the amplitude of vibration of the stylus, thereby providing a high degree of fidelity in the output in any desired operating range of frequencies selected for reproduction.

In a higher frequency band in the operating range selected for reproduction, the response may be enhanced by means of the bowed form of the armature element which permits the stiff intermediate or bridge section to vibrate with a greater amplitude in said band than the stylus. This is by reason of the fact that in that range, the intermediate section is free to oscillate synchronously with and at greater amplitude than the stylus, thereby amplifying the amplitude of vibration of the armature as a unit between its fixed electrodes and thus effecting a greater capacity variation in the range referred to.

This wider excursion of the intermediate section of the armature may be arranged to occur in a frequency range extending from any desired higher frequency upwardly. In the reproduction of current phonograph records, the amplified vibrational response of the armature is arranged to begin at approximately 4000 cycles for example and to fall to normal or lower amplitude at an upper limit, such as 8000 cycles, for example, with a maximum response at an intermediate point such as at approximately 6500 cycles.

This action is controlled by the length, stiffness and mass of the armature element and serves to accentuate the tonal response of the reproducing system in which the device is connected. It is particularly effective in providing improved reproduction in connection with records which may be deficient in tonal brilliance.

Further considering the operation of the armature member, it will be seen that its resonance characteristics must be considered when it is in the playing position, that is, with the stylus end engaged in the record groove and the rear end anchored to the support. In this position the stiff intermediate section of the armature member operates as if the ends were fixed or clamped at the points mentioned above, the longitudinal axis of the intermediate section being thus vertically offset from a line extending commonly through said points. It then has two modes of vibration in response to excitation from a lateral movement of the stylus as it follows the sound record.

One mode of vibration takes place about the "fixed" points above indicated and mainly provides the increased amplitude of vibration and improved frequency response characteristic previously described. It is caused by the off-center clamping of the ends of the armature element, about which the intermediate section may vibrate with greater amplitude than the stylus at certain frequencies. The mass of the intermediate section resonates with the lateral compliance of the armature at the hinge point 47 and its torsional compliance at points 46 and 47 to produce a resonance peak at any desired frequency, as, for example, from 3000 cycles to 15,000 cycles. This resonance is suitably damped by the material at 50 in the present example.

The second mode of vibration occurs because of the flexing of the armature member at substantially the mid-point or mode of its intermediate section. Because of the stiffness and low mass which may be provided by the construction shown and described, and because it is also dependent upon the length of the armature, this nodal resonance may occur at very high frequencies such as beyond the useful or operating range selected or at the upper end thereof. With armature members of the type shown, approximately 1/4" long and made of aluminum tubing of the size indicated herein, such nodal resonance may occur at frequencies of the order of 16,000 cycles and higher.

Where straight line high frequency response is desired, e. g. on the order of 16,000 cycles, the two resonances may be combined to complement one another and produce a uniform high frequency response. A sharp high frequency cut-off may be effected by causing the two resonances to occur within the same octave and adjusting the damping.

If no accentuation of high frequencies is desired, both modes may be caused to have resonances which fall above the useful or desired frequency range for which faithful reproduction is sought.

In general, however, as hereinbefore pointed out, the desired stiffness and frequency response is imparted to the device by determining the length of the stiff portion of the stylus member located between the free or stylus end and the hinge or bending point for lateral movement between the electrodes. Both the lateral hinge or bending point and the vertical compliance hinge are readily formed in the device by compressing or deforming the tubular body of the stylus member thereby adding no weight for the purpose of effecting a hinge or bending action. Furthermore by reason of the tubular construction, the area exposed for capacity variation purposes may readily be increased by flattening the cross section of the tubular form of the stylus member.

Suitable damping material may be located about the hinge or bending points in the form of a drop of "Viscoloid" or the like which bonds readily to the metal parts of both stylus member and the supporting structure. Altogether the construction is one for producing the desired results with minimum weight through the cooperative relation of the parts and the type of tubular structure employed both in the stylus member and the tone arm.

In use, this device has shown an unusually smooth frequency characteristic with a modulator system as shown in my aforesaid co-pending application and provides an improved response over the usable portion of the audio frequency range encountered in full range sound reproduction. With all types of record regardless of condition, the pick-up tracks accurately with needle pressures of one gram or less.

The device of the present invention is adapted for the fine reproduction of phonograph records and the like, particularly in connection with the electrical system of my aforesaid application, but is not limited thereto and may be utilized in other ways and for other purposes involving the effective translation of mechanical vibrations into electrical circuit variations through the medium of variable capacity.

What is claimed as new and useful is:

1. In an electric pick-up device, a bowed metallic tubular armature, a support for said armature comprising a sleeve having a plate member extending axially therefrom, means for securing one end of the armature to said plate member with the armature bowed in a plane substantially normal to the plate and arched between two points thereon, a stylus inserted in the opposite end of the armature and extending therewith through the plate, a flattened section in said armature adjacent the secured end thereof providing a flexible hinge for movement of said armature, a removable plug of insulating material mounted in said sleeve, and a pair of spaced electrodes extending through said plug in substantially parallel relation to each other and forwardly therefrom along a portion of the length of said armature on opposite sides thereof and in substantially equally spaced relation thereto.

2. A vibration translating device of the variable capacity type comprising a bowed metallic tubular armature, a support for said armature including a cylindrical sleeve having a plate member extending axially therefrom, means for securing one end of the armature to said plate whereby said armature extends longitudinally from the sleeve along the plate member in spaced relation thereto with the armature bowed in a plane substantially normal to the plate and arched between two points thereon, said plate having a forwardly positioned opening therethrough in which the opposite end of the armature is located, means providing a dust screen for said opening about said last-named end of the armature, a stylus inserted in said last-named end of the armature and depending through said opening, a flattened section in said armature adjacent the secured end of the armature providing a flexible zone therein for movement of said armature in a plane substantially parallel with the plate member, a removable plug of insulating material mounted in said sleeve, and a pair of spaced elongated electrodes extending through said plug in substantially parallel relation to each other and forwardly therefrom along a portion of the length of said armature on opposite sides thereof and in substantially equally spaced relation thereto.

3. A vibration translating device of the electro-acoustical type for the reproduction of phonograph records and the like comprising, a stylus support and a stylus mounted therein, said stylus support comprising a tubular elongated U-shaped metallic member, a plate to which the rear end of said stylus support is fixed, a stylus arm for detachably receiving said plate, and a pair of elongated metallic electrodes associated with said stylus support as fixed capacity elements with respect to which said stylus support is relatively movable differentially in response to vibrations applied to said stylus.

4. In an electric pick-up device a bowed tubular metallic armature for a stylus element, a support for said armature including a metallic sleeve having a plate member extending axially therefrom, means for electrically and mechanically connecting one end of the armature to said plate member with the armature bowed in a plane substantially normal to the plate and arched between two points thereon, a stylus element inserted in the opposite end of the armature and extending therewith through the plate, a removable plug of insulating material mounted in said sleeve, a pair of electrodes extending through said plug in spaced substantially parallel relation to each other and disposed on opposite sides of the armature in substantially equally spaced relation thereto, a pivotally mounted tone arm adapted at its forward end to mechanically and electrically engage said sleeve when inserted therein, a pair of leads extending through the tone arm and detachably connected each with one of said electrodes, a thin strip of insulating material inserted in said tone arm throughout a major portion of the length thereof substantially across a diameter of said arm, and means for securing said leads to said insulating strip substantially midway between the diametrically opposite edges thereof along the length of said strip, whereby said leads are held substantially in coaxial relation to the walls of the tone arm in passing therethrough.

5. In a variable capacity pick-up device, the combination of a support, a bowed tubular armature element of needle-like proportions anchored at one end to the support, stylus means for imparting vibratory movement to the opposite end thereof in a predetermined frequency range, said armature element having an intermediate section between said ends of such reduced stiffness and mass that the amplitude of vibration thereof in response to vibration of the stylus is increased with respect to the amplitude of vibration of the stylus in a predetermined high frequency portion of said frequency range, and electrode means separable from said armature element as a unit and coacting therewith to produce capacity variations in response to normal and enhanced vibration of said intermediate section of said armature element.

6. In a variable capacity pick-up device, the combination of a support, a bowed tubular armature element of needle-like proportions anchored at one end to the support, stylus means for imparting vibratory movement to the opposite end thereof in a predetermined frequency range, said armature element having an intermediate section between said ends of such reduced stiffness and mass that the amplitude of vibration thereof in response to vibration of the stylus is increased with respect to the amplitude of vibration of the stylus in a predetermined high frequency portion of said frequency range.

7. In an electrical pick-up device, a bowed metallic tubular armature, a support for said armature comprising a sleeve having a plate member extending axially therefrom, means for securing one end of the armature to said plate member with the armature bowed in a plane substantially normal to the plate and arched between two points thereon, a stylus inserted in the opposite end of the armature and extending therewith through the plate, a removable plug of insulating material mounted in said sleeve, a pair of spaced elongated electrodes extending through said plug in substantially parallel spaced relation to said stylus member, and a pivotally mounted tone arm having means at its forward end adapted to mechanically and electrically engage said arm with said sleeve, said last-mentioned means including contact elements carried by said tone arm for respectively engaging the inner ends of said spaced electrodes.

8. In an electric pick-up device, a bowed tubular metallic armature for a stylus element, a support for said armature including a metallic sleeve having a plate member extending axially therefrom, means for electrically and mechanically connecting one end of the armature to said plate member with the armature bowed in a plane substantially normal to the plate and arched between two points thereon, a stylus element inserted in the opposite end of the stylus member and extending therewith through the plate, a removable plug of insulating material mounted in said sleeve, a pair of electrodes extending through said plug in spaced, substantially parallel relation to each other and disposed on opposite sides of the armature in substantially equally spaced relation thereto, and a pivotally mounted tone arm having means at its forward end to mechanically and electrically engage said sleeve when inserted therein, said last-mentioned means including contact elements carried by said tone arm for respectively engaging the inner ends of said spaced elements.

9. An electric pick-up device of the variable capacity type comprising a pair of fixed spaced capacitor electrodes, an elongated bowed tubular electrode of needle-like proportions extending in substantially parallel relation to and between said first named electrodes, means in said tubular electrode adjacent one end thereof forming therein a flexible zone for movement of said tubular electrode laterally between said fixed electrodes, and a stylus inserted in and carried by the opposite end of said tubular electrode.

10. In an electric pick-up of the variable capacity type, a movable electrode comprising an elongated thin-walled metallic tube of needle-like proportions bowed between its ends and having at least one deformation of the tubular cross section thereof adjacent one end to provide a flattened area for flexing thereof in a given plane, a pointed stylus inserted in and carried by the opposite end of said electrode, a thin metallic plate having an opening through which said stylus end of the movable electrode extends, means for securing the opposite end of said movable electrode to said plate with the armature bowed in a plane substantially normal to the plate and arched between two points thereon, a pair of fixed metallic electrodes associated with said movable electrode, an insulating plug in which said last named electrodes are mounted in substantially parallel spaced relation to each other, and a socket connected with said plate for receiving said plug, said socket and plug being respectively provided with coacting interlocking means for holding said plug against axial movement relatively to said socket and plate and thereby maintain said last named electrodes in predetermined spaced relation to said movable electrode when at rest.

PAUL WEATHERS.

REFERENCES CITED

The following references are of record in the file of this patent:

UNITED STATES PATENTS

| Number | Name | Date |
|---|---|---|
| 1,472,214 | Gonce | Oct. 30, 1923 |
| 1,475,227 | Ferguson | Nov. 27, 1923 |
| 1,742,257 | Johnson | Jan. 7, 1930 |
| 1,830,801 | McClatchie | Nov. 10, 1931 |
| 1,909,995 | Yeider | May 23, 1933 |
| 2,308,795 | Vermeulen | Jan. 19, 1943 |
| 2,319,622 | Miessner | May 18, 1943 |
| 2,371,373 | Badmaieff | Mar. 13, 1945 |
| 2,415,403 | Bachman | Feb. 11, 1947 |
| 2,426,061 | Snepvangers | Aug. 19, 1947 |

FOREIGN PATENTS

| Number | Country | Date |
|---|---|---|
| 427,024 | Great Britain | Apr. 15, 1935 |